США011200098B2

(12) United States Patent
Roy et al.

(10) Patent No.: US 11,200,098 B2
(45) Date of Patent: Dec. 14, 2021

(54) REDUCTION OF INTERRUPT SERVICE LATENCY IN MULTI-PROCESSOR SYSTEMS

(71) Applicant: NXP USA, Inc., Austin, TX (US)

(72) Inventors: Sourav Roy, Kolkata (IN); Sneha Mishra, Gurgaon (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/279,103

(22) Filed: Feb. 19, 2019

(65) Prior Publication Data
US 2020/0264886 A1   Aug. 20, 2020

(51) Int. Cl.
*G06F 9/52* (2006.01)
*G06F 9/38* (2018.01)
*G06F 9/30* (2018.01)

(52) U.S. Cl.
CPC ............ *G06F 9/52* (2013.01); *G06F 9/30043* (2013.01); *G06F 9/3836* (2013.01)

(58) Field of Classification Search
CPC ................................. G06F 9/3836; G06F 9/52
See application file for complete search history.

(56) References Cited

U.S. PATENT DOCUMENTS

| | | | | |
|---|---|---|---|---|
| 4,789,924 A | * | 12/1988 | Fukuta | G06F 11/261 703/23 |
| 5,542,076 A | * | 7/1996 | Benson | G06F 9/4812 710/260 |
| 6,567,873 B1 | | 5/2003 | Henriksen | |
| 9,128,736 B1 | * | 9/2015 | McCann | G06F 9/545 |
| 2003/0105902 A1 | * | 6/2003 | Burgess | G06F 9/3836 710/263 |
| 2005/0223302 A1 | | 10/2005 | Bono | |
| 2005/0246505 A1 | | 11/2005 | McKenney et al. | |
| 2018/0089083 A1 | | 3/2018 | Deshpande | |

OTHER PUBLICATIONS

Motorola; "PowerPC Microprocessor Family: The Programming Environments for 32-bit Microprocessors"; Rev 1; Jan. 1997; pp. 2-21 and 4-53 to 4-55 (Year: 1997).*
Dietrich, S. and Walker, D., "The Evolution of Real-Time Linux," downloaded from http://people.redhat.com/~mingo/realtime-preempt/ on Nov. 5, 2018, pp. 1-18.
(Continued)

*Primary Examiner* — William B Partridge (57) ABSTRACT

A technique for operating a system including a plurality of processors and a shared resource includes executing a first instruction by a first processor of the plurality of processors. The first instruction generates a reservation of the shared resource for the first processor. The technique includes, after generating the reservation of the shared resource for the first processor, executing a spin lock by the first processor until successful execution of a second instruction acquires a lock of the shared resource. The technique includes disabling interrupts of the first processor in response to an indicator of the successful execution of the second instruction. The first instruction may be a load and reserve instruction and the second instruction may be a conditional store instruction.

20 Claims, 4 Drawing Sheets

(56) References Cited

OTHER PUBLICATIONS

Hennessy, J. and Patterson, D., "Computer Architecture: A Quantitative Approach," Morgan Kaufmann Publishers, Jan. 2003, USA, pp. 590-604.
ARM: "ARM Synchronization Primitives Development Article", website: https://developer.arm.com/documentation/dht0008/a, Copyright 2009, DHT0008A, ID081709, pp. 1-28.
Ruocco: "A Real-Time Programmer's Tour of General-Purpose L4 Microkernels", EURASIP Journal on Embedded Systems, DOI: 10.1155/2008/234710, vol. 2008, Jan. 2008, pp. 1-14.

* cited by examiner (PRIOR ART)
FIG. 1

REDUCTION OF INTERRUPT SERVICE LATENCY IN MULTI-PROCESSOR SYSTEMS

BACKGROUND

Field of the Invention

This invention relates to processing systems, and more particularly, to synchronization of multi-processor systems that share a resource.

Description of the Related Art

In a multi-processor system or a multi-threaded system, multiple independent processes (e.g., threads of execution or tasks) are prohibited from updating a shared resource (e.g., a memory location or a peripheral device) concurrently. This property of concurrency control, referred to as mutual exclusion, prevents one process from writing the shared resource while the shared resource is being manipulated or read by another process. To guarantee data integrity, sequentialized access is imposed on software that operates on shared data. Accordingly, a shared resource that is operated upon by multiple independent processes is protected from context switches to prevent overlap of read-modify-update operations. Conventional synchronization techniques encapsulate software accesses to a shared resource in regions of code guarded by synchronization primitives (e.g. locks). Those guarded regions of code are called critical sections. Critical sections are executed as an atomic action (i.e., executed so that no intervening operation can occur) that can be executed by only one process at a time. Spin locks are used to implement such mutual exclusion by causing a process trying to acquire a lock to spin around in a loop of instructions until the process succeeds in acquiring the lock. The semantics of a critical section dictate that only one process can execute the critical section at a time. In general, a spin lock can have only one of two states: locked or unlocked. A test-and-set operation is atomically performed so that only one process can obtain the lock, even if several processes are spinning at a time.

A conventional processor (e.g., microprocessor, microcontroller, digital signal processor, central processing unit, graphics processing unit, or other processing unit) acquires a lock using load/store instructions:

```
do {
    do {
            load reserve to address A (= val)
    } while (val == 0);
    --val;
    Store word conditional to address A (val)
} while (conditional store success == 1);
}
```

To avoid deadlock and context corruption, interrupts (i.e., pre-emption) are disabled while the spin lock is held. The disabling of interrupts substantially contributes to the latency of system response to real-time events (e.g., external interrupts or other pre-emption events). A conventional spin lock (e.g., a Linux spin lock) is spin_lock_irq (spinlock_t*lock). This implementation disables interrupts unconditionally before acquiring the lock and re-enables interrupts after releasing the lock. For example:

```
preemption_disable( )
spinlock_t mr_lock = SPIN_LOCK_UNLOCKED;
spin_lock_irq(&mr_lock);
/* critical section ... */
spin_unlock_irq(&mr_lock);
preemption_enable( ).
```

An exemplary PowerPC Reduced Instruction Set Computer (RISC) architecture includes a pair of instructions where the second instruction in the program flow returns a value from which the processor can deduce whether the pair of instructions was executed atomically, i.e., if it appears that all other operations on a target shared resource executed by other processors occurred before or after execution of the pair of instructions. For example, when a processor executes a load and reserve instruction (e.g., lwarx in the PowerPC instruction set architecture) followed by a conditional store instruction (e.g., stwcx in the PowerPC instruction set architecture) the sequence of the lwarx instruction indirectly followed by the stwcx instruction emulates a read-modify-write operation on a specified memory location that stores a lock variable associated with a shared resource. The load and reserve instruction creates a reservation of the specified memory location for use by a subsequent conditional store instruction with the same memory address as an operand. If a reservation created by a lwarx instruction exists and the memory address specified by a conditional store instruction is the same as that specified by a prior load and reserve instruction that established the reservation, then the stwcx instruction stores the contents of a register operand in the reserved memory location and the reservation is cleared; otherwise contents of the memory location are not modified. The processor sets one or more bits of a condition code register to indicate whether the store is performed, i.e., whether the processor has acquired a lock of the shared resource associated with the lock variable. The use of stwcx and lwarx instructions ensure that no other processor or mechanism has modified the specified memory location between execution of the lwarx instruction and the completion of the stwcx instruction, and success of that stwcx instruction results in a lock that can be used to implement spin locks used to build synchronization routines.

After acquisition of a lock, the processor executes a critical section. To release the lock, the processor resets a value stored in the lock variable. In general, no context switch is allowed while the processor executes the critical section, otherwise deadlock may result with each process spinning or looping to acquire the same lock. Therefore, each processor should block interrupts throughout execution of the critical section. In general, disabling interrupts after the spin lock may create a race condition because the software typically takes a few cycles to disable the interrupts and the processor may service an unwanted interrupt or preemption during those few cycles, which can cause deadlock. Thus, software typically disables the interrupts before the spin lock, which increases the latency of servicing interrupts.

In general, lock acquisition is associated with an unpredictable delay since lock acquisition is hardware-dependent. Each of the processors spinning to acquire the same lock may not eventually acquire the lock and retries may prolong the delay. If N processors attempt to acquire the same lock, each of the N processors begins by disabling its interrupts and spinning in a loop to acquire lock. This may increase latency for response to a real-time event or other interrupt and the latency may be linearly related to the number of processors in the system competing for the same lock. Accordingly, improved synchronization techniques are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

Figure 1:
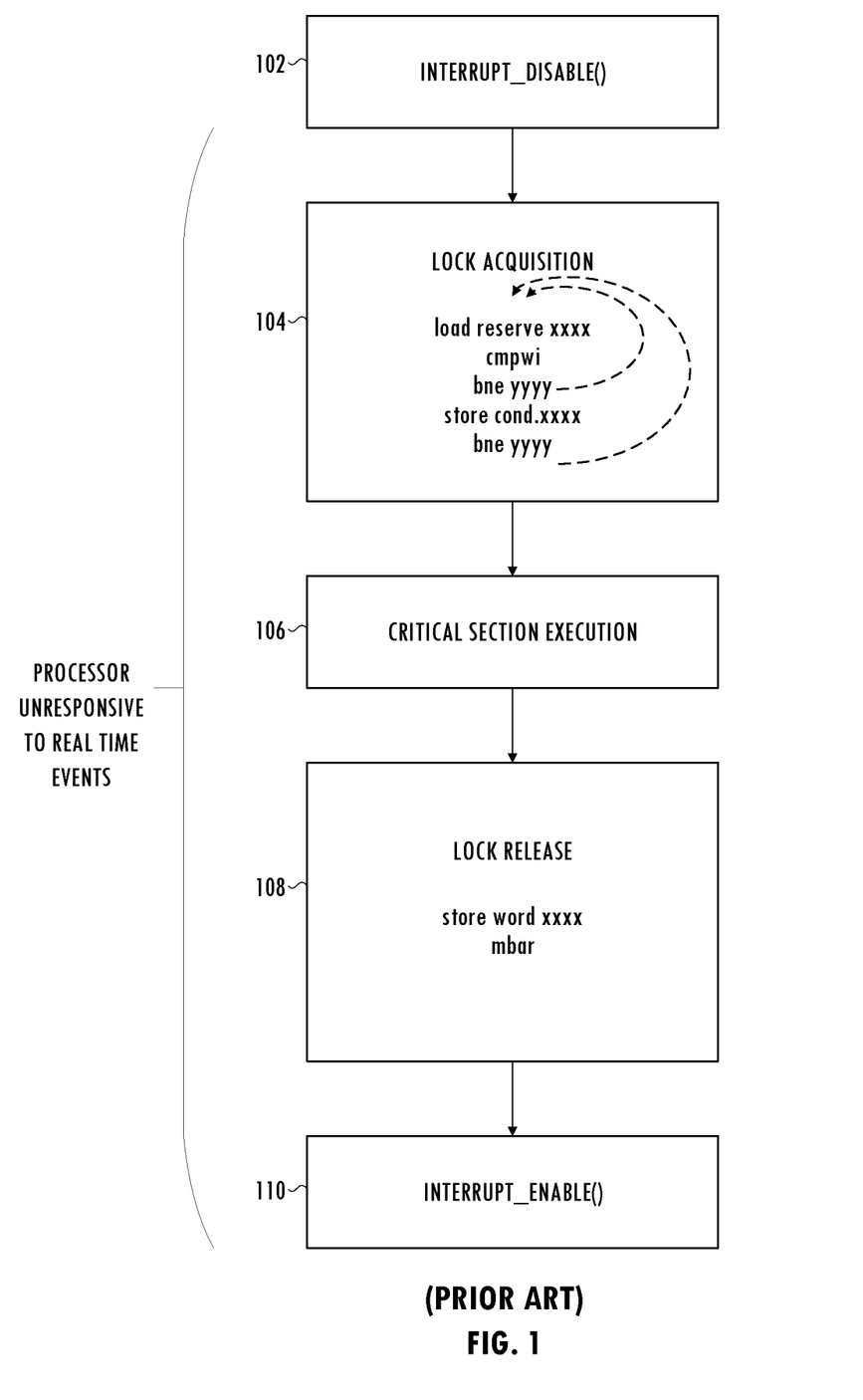
FIG. 1 illustrates a conventional program flow for an exclusive access of a shared resource by a processor in a multi-processor system.

Referring to FIG. 1, in an exemplary program flow of a processor in an exemplary multi-processor system, lock acquisition 104 includes load and reserve instructions that loop until a reservation is acquired and a conditional store instruction that loops until acquiring the lock. The processor executes an interrupt_disable function 102 that disables interrupts for the duration of lock acquisition 104, critical section execution 106, and lock release 108. If multiple processors compete for the same shared resource, interrupts may be blocked on each processor of the multiple processors until that processor acquires the lock, executes its critical section, and then releases the lock. The processor executes an enable_interupt function 110 after lock release 108. Typically, software disables interrupts prior to the processor attempting to acquire lock of a semaphore that is used to control access to the shared resource. Spinning during lock acquisition consumes most of the time associated with execution of the critical section.

Figure 2:
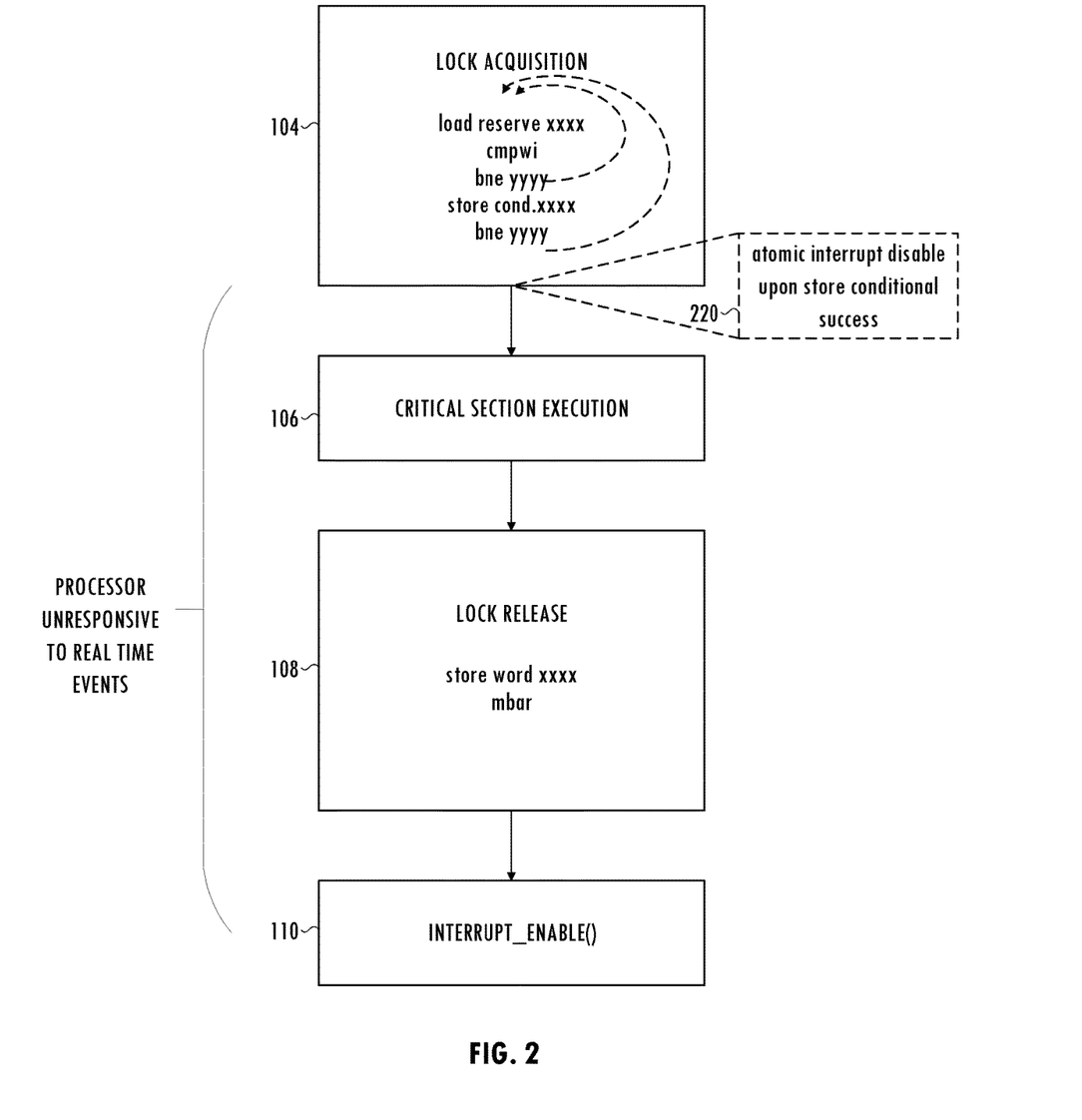
FIG. 2 illustrates an exemplary program flow for an exclusive access of a shared resource by a processor in a multi-processor system consistent with at least one embodiment of the invention.

Referring to FIG. 2, a technique atomically disables processor interrupts prior to execution of critical sections of code, thereby reducing the latency associated with response to real-time events in a multi-processor system. The technique reduces the duration for which the system is unresponsive to interrupts by atomically disabling interrupts via processor hardware only after the processor successfully acquires a lock. Atomically disabling interrupts using hardware reduces or eliminates an interval between lock acquisition and the interrupt disable that can otherwise cause deadlock if an interrupt is received by the processor. The program flow of FIG. 2 omits interrupt_disable( ) 102 of the program flow of FIG. 1. Thus, the program flow of FIG. 2 (e.g., lock acquisition 104, critical section execution 106, lock release 108, an interrupt_enable( ) 110) exposes the associated processor to real-time events that require servicing interrupts during spinning of lock acquisition 104. The processor is able to handle interrupts during spin lock and only disables interrupts after a conditional store succeeds. The remainder of the program flow of FIG. 2 is unchanged from the program flow of FIG. 1. However, the processor includes hardware that implements atomic interrupt disable 220 in response to a successful conditional store, thereby considerably reducing the interrupt service latency associated with spin locks of lock acquisition. Thus, the technique reduces the time that the processor is unresponsive to real-time events (e.g., to the duration of critical section 106, lock release 108, and interrupt_enable( )function 110).

Figure 3:
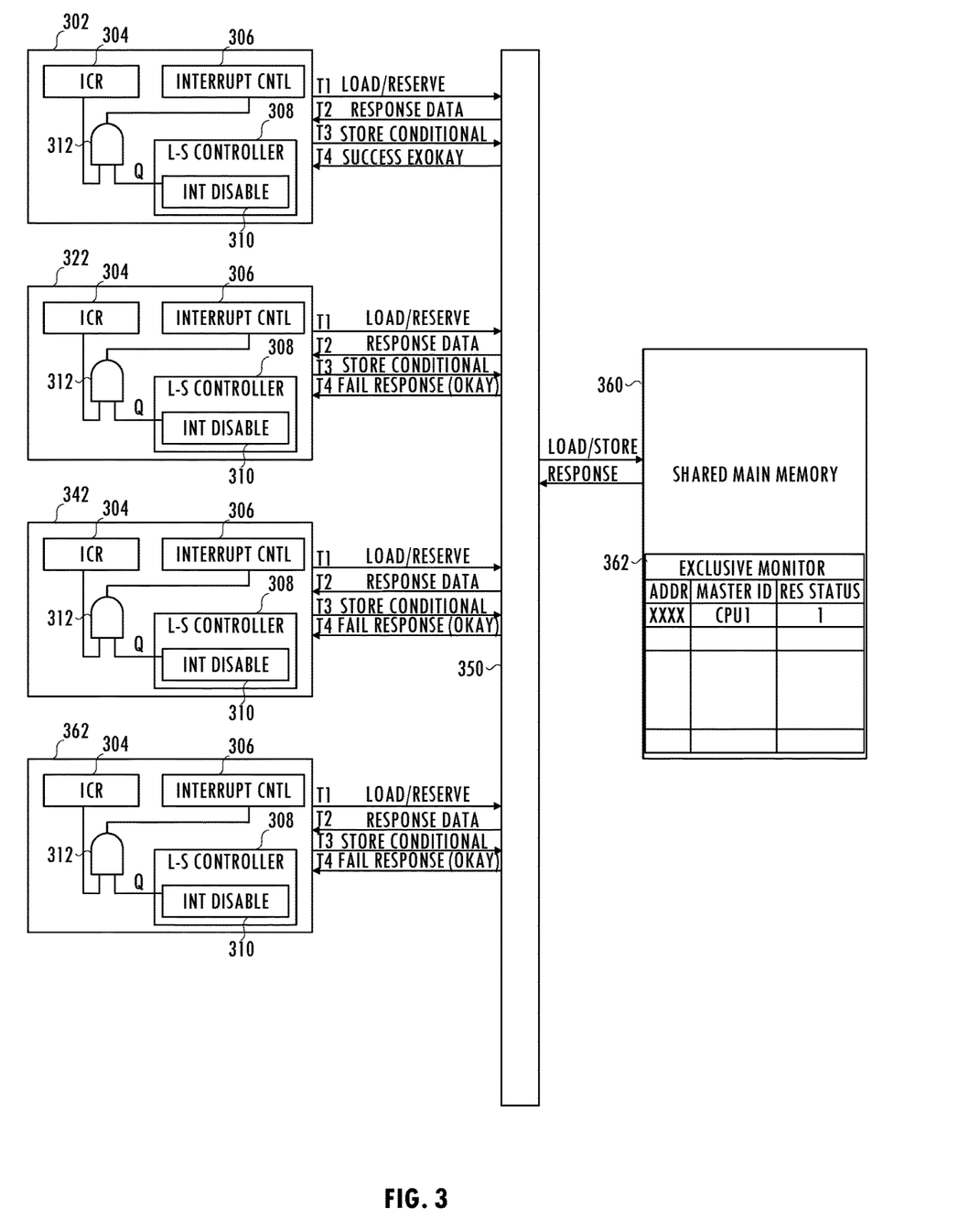
FIG. 3 illustrates a functional block diagram of a multi-processor system including a shared resource consistent with at least one embodiment of the invention.

Referring to FIG. 3, an exemplary multi-processor system includes processors 302, 322, 342, and 362 that communicate with shared main memory 360 via interconnect 350. In at least one embodiment, shared main memory 360 provides support for exclusive/atomic operations. For example, shared main memory 360 sends responses to load and reserve instructions (e.g., lwarx) and to conditional store instructions (e.g., stwcx), as described above. In addition, exclusive monitor 362 stores variables that control access to shared memory locations. In response to a load and reserve instruction, exclusive monitor 362 updates a variable associated with the target memory location to reflect that a shared memory location is reserved and identifies as a master, the processor that made the reservation. In at least one embodiment, exclusive monitor 362 clears the reservation in response to a successful conditional store to the memory location that stores the variable. In at least one embodiment, interconnect 350 has an Advanced Microcontroller Bus Architecture for connection and management of functions blocks in system-on-a-chip (SoC) designs. However, other interconnect architectures may be used.

In at least one embodiment, processors 302, 322, 342, and 362 spin while attempting acquire a lock of a variable stored in shared main memory 360, e.g., by using a load and reserve/conditional store pair of instructions to the associated address in exclusive monitor 362 in shared main memory 360. Processor 302 issues a LOAD/RESERVE (e.g., lwarx) instruction at time T1 and receives response of the associated data at time T2. Processors 322, 342, and 362 also issue a LOAD/RESERVE instruction at time T1 and also receive the response of read data at time T2. After a read of the variable, processor 302 issues a conditional store instruction (e.g., stwcx) at time T3, and successfully acquires lock of the variable. Interconnect 350 communicates EXOKAY indicating the successful conditional store instruction to processor 302 at time T4. In an embodiment, processor 302 sets one or more bits of a condition code register or provides another indication of whether the store is performed. Load-store controller 308 of processor 302 uses the EXOKAY response or other indication of successful condition store to generate an interrupt disable signal and causes software executing on processor 302 to execute a critical section at time T4. Processors 322, 342, and 362 also issue a conditional store instruction (e.g., stwcx) at time T3, but do not successfully complete the operation. Processors 322, 342, and 362 receive response OKAY at time T4, indicating failure of the exclusive access. In some embodiments, processors 322, 342, and 362 each set one or more bits of a corresponding condition code register or provide another indication of the unsuccessful store. Only processor 302 acquires the lock of the variable and processors 322, 342, and 362 spin in attempts to acquire lock of the variable.

Figure 4:
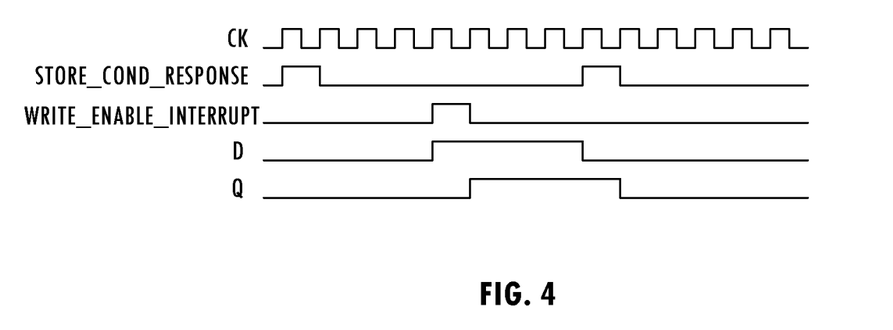
FIG. 4 illustrates waveforms for an interrupt disable unit of a load-store controller of each processor of the multi-processor system of FIG. 3 consistent with at least one embodiment of the invention.
Figure 5:
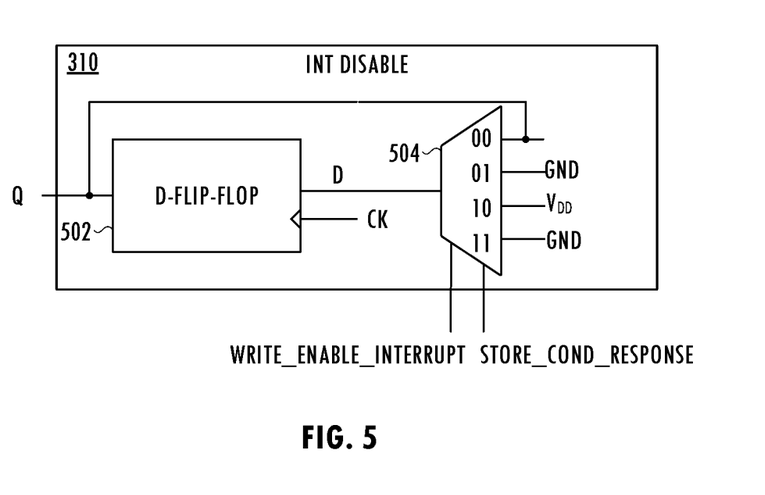
FIG. 5 illustrates a circuit diagram for an exemplary interrupt disable unit of a load-store controller of each processor of the multi-processor system of FIG. 3 consistent with at least one embodiment of the invention.

Referring to FIGS. 3, 4, and 5, in at least one embodiment, atomic interrupt disable circuit 310 is responsive to the conditional store response received from interconnect 350 and a write to an interrupt configuration stored in interrupt control register 304, as indicated by input signals WRITE_ENABLE_INTERRUPT and STORE_COND_RESPONSE (or other indicator of a successful conditional store, e.g., a condition code). In at least one embodiment, atomic interrupt disable circuit 310 of load-store controller 308 of a processor de-asserts output signal Q, which overrides the interrupt enable configuration stored in interrupt configuration register 306. When software writes to interrupt control register 304 to enable interrupts (e.g., using a pulse of WRITE_ENABLE_INTERRUPT), if atomic interrupt disable circuit 310 has not received an indication of a successful conditional store response (e.g., STORE_COND_RESPONSE=='0'), select circuit 504 outputs a value that corresponds to interrupts being enabled and D-flip-flop 502 updates output signal Q with a signal level that corresponds interrupts being enabled (e.g., Q=='1') in response to clock signal CK. When STORE_COND_RESPONSE has a value indicating a successful conditional store instruction (e.g., STORE_COND_RESPONSE=='1'), regardless of the value of the signal for enabling a write to the interrupt control register, select circuit 504 provides a value that disables interrupts (e.g., D=='0'), and D-flip-flop 502 updates output signal Q with a corresponding signal level (e.g., Q=='0') in response to clock signal CK. In at least one embodiment, atomic interrupt disable circuit 310 operates consistent with the following truth table:

| STORE_COND_RESPONSE | WRITE_EN-ABLE_INTERRUPT | D | Q(t + 1) |
|---|---|---|---|
| 0 | 0 | Q(t) | Q(t) |
| 0 | 1 | 1 | 1 |
| 1 | 0 | 0 | 0 |
| 1 (invalid) | 1 (invalid) | 0 | 0 |

Logic circuit 312 (e.g., an AND gate) uses output signal Q to override the other input to the interrupt controller 306 in response to receiving the indication of a successful conditional store. Note that atomic interrupt disable circuit 310 illustrated in FIG. 5 is exemplary only, and other combinations of logic and state elements may be used to achieve the atomic disable of interrupts in response to a successful conditional store instruction. In at least one embodiment of the multi-processor system, the resulting disable of interrupts happens on the next clock cycle after receiving the pulse of STORE_COND_RESPONSE.

A method for operating a system including a plurality of processors and a shared resource includes executing a first instruction by a first processor of the plurality of processors, the first instruction generating a reservation of the shared resource for the first processor. The method includes after generating the reservation of the shared resource for the first processor, executing a spin lock by the first processor until successful execution of a second instruction acquires a lock of the shared resource. The method includes disabling interrupts of the first processor in response to an indicator of the successful execution of the second instruction. The indicator may be based on a response signal received from the shared resource. A load-store unit of the first processor may perform the disabling in response to the indicator of the successful execution of the second instruction.

The shared resource may be a memory location and the first instruction loads data from the memory location to a register of the first processor. The second instruction may store data in the memory location based on the reservation of the shared resource. The first instruction may be a load and reserve instruction and the second instruction may be a conditional store instruction. The method may include after the successful execution of the second instruction, executing a critical section by the first processor using the shared resource. The method may include after executing the critical section, releasing the lock of the shared resource and enabling interrupts of the first processor. Disabling the interrupts may include combining an atomic hardware interrupt enable signal generated by a load-store unit of the first processor with an interrupt enable signal stored in an interrupt control register to generate an interrupt enable control signal. Disabling the interrupts may include updating a state element based on a write enable of the interrupt control register and a conditional store response.

A processing system including a plurality of processors and a shared resource includes a first processor of the plurality of processors. The first processor includes an interrupt controller configured to selectively enable interrupts of the first processor in response to a stored configuration. The first processor includes an execution unit configured to disable interrupts of the first processor in response to an indication of successful execution of an instruction by the shared resource. The first processor may be configured to execute a first instruction to generate a reservation of the shared resource for the first processor. The first processor may be configured to execute a spin lock after generation of the reservation and until successful execution of a second instruction that acquires a lock of the shared resource.

The processing system may include a main memory and interconnect coupled between the main memory and each processor of the plurality of processors. The main memory may include the shared resource. The shared resource may be a memory location. The main memory may include an exclusive monitor including an entry corresponding to the memory location. The entry may include a master identifier and a reservation status. The master identifier indicates the first processor. The execution unit may be configured to generate an atomic hardware interrupt enable signal. The execution unit may be configured to reset the atomic hardware interrupt enable signal in response to a successful conditional instruction. The processing system may include an interrupt control register providing an interrupt enable signal. The interrupt controller may receive an enable signal based on a combination of the atomic hardware interrupt enable signal and the interrupt enable signal. The execution unit may be a load-store unit configured to generate an atomic hardware interrupt enable signal that selectively disables interrupts in response to a successful conditional store instruction. The shared resource may be a peripheral device.

A processing system includes a plurality of processing cores and a shared memory coupled to each processing core of the plurality of processing cores. Each processing core of the plurality of processing cores may include an interrupt controller configured to selectively enable interrupts of the processing core in response to a stored configuration and a load-store unit configured to selectively disable interrupts of execution of the processing core in response to a signal indicating successful execution of a conditional store operation by the shared memory. The processing system may include interconnect coupled between the shared memory and each of the plurality of processing cores. The shared memory may include an exclusive monitor including an entry corresponding to a shared memory location. The entry may include a master identifier and a reservation status. The master identifier may indicate a core of the plurality of processing cores that has reserved the shared memory location. The load-store unit may generate an atomic hardware interrupt enable signal that selectively disables interrupts in response to a successful conditional store instruction. Each processing core of the plurality of processing cores may include an interrupt control register providing an interrupt enable signal. The interrupt controller may receive an enable signal based on a combination of the atomic hardware interrupt enable signal and the interrupt enable signal. The load-store unit may be configured to reset the atomic hardware interrupt enable signal in response to a successful conditional store instruction.

Thus, techniques for reducing system latency for responding to an interrupt of processor instruction execution have been disclosed. The techniques allow a processor to service interrupts while spinning during lock acquisition. Using a negligible amount of additional hardware, the technique has enlarged the interval during which a processor services interrupts. The technique reduces or eliminates unpredictability by atomically disabling interrupts via hardware in response to a successful lock acquisition. The technique can be used in multi-processor platforms that share a resource that supports exclusive/reserved transactions. The technique removes the requirement that software explicitly disable interrupts.

Although the invention is described herein with reference to specific embodiments, various modifications and changes can be made without departing from the scope of the present invention as set forth in the claims below. For example, while the invention has been described in an embodiment in which a PowerPC instruction set is used, one of skill in the art will appreciate that the teachings herein can be adapted to other instructions implemented by other instruction set architectures. While the invention has been described in an embodiment in which a load/store unit coupled to a shared memory includes hardware to atomically disable interrupts, one of skill in the art will appreciate that the teachings herein can be adapted to other execution units and other shared resources (e.g., peripherals (on-chip or off-chip), etc.). Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a system including a plurality of processors and a shared resource, the method comprising:
   executing a spin lock at a first processor without first disabling interrupts of the first processor, where the spin lock is executed by:
      executing a first instruction by a first processor of the plurality of processors, the first instruction generating a reservation of the shared resource for the first processor; and
      after generating the reservation of the shared resource for the first processor, executing a second instruction by the first processor to acquire a lock of the shared resource; and
   disabling interrupts of the first processor in response to an indicator of successful execution of the second instruction.

2. The method, as recited in claim 1, wherein the indicator is based on a response signal received from the shared resource.

3. The method, as recited in claim 1, wherein a load-store unit of the first processor performs the disabling in response to the indicator of the successful execution of the second instruction.

4. The method, as recited in claim 1, wherein the shared resource is a memory location and the first instruction loads data from the memory location to a register of the first processor and the second instruction stores data in the memory location based on the reservation of the shared resource.

5. The method, as recited in claim 1, wherein the first instruction is a load and reserve instruction and the second instruction is a conditional store instruction.

6. The method, as recited in claim 1, further comprising:
   after the successful execution of the second instruction, executing a guarded code region of code as an atomic action by the first processor using the shared resource; and
   after executing the guarded code region of code, releasing the lock of the shared resource and enabling interrupts of the first processor.

7. The method, as recited in claim 1, wherein disabling interrupts comprises:
   logically combining an atomic interrupt disable signal generated by a load-store unit of the first processor with an interrupt enable signal stored in an interrupt control register to generate an interrupt enable control signal.

8. The method, as recited in claim 7, wherein disabling interrupts comprises:
   updating a state element based on a write enable of the interrupt control register and a conditional store response.

9. The method, as recited in claim 1, wherein the disabling is performed atomically using hardware of the first processor in response to successfully acquiring the lock.

10. A processing system including a plurality of processors and a shared resource, the processing system comprising:
    a first processor comprising an interrupt controller and an execution unit configured to execute a spin lock at the first processor without first disabling interrupts of the first processor;
    where the spin lock is executed by:
       executing a first instruction to generate a reservation of the shared resource for the first processor, and
       after generating the reservation of the shared resource for the first processor, executing a second instruction by the first processor to acquire a lock of the shared resource; and
    where the execution unit is configured to disable interrupts of the first processor in response to an indication of successful execution of the second instruction by the shared resource.

11. The processing system, as recited in claim 10, further comprising:
    a main memory; and
    interconnect coupled between the main memory and each processor of the plurality of processors,
    wherein the main memory comprises:
       the shared resource, wherein the shared resource is a memory location; and an exclusive monitor including an entry corresponding to the memory location, the entry including a master identifier and a reservation status, the master identifier indicating the first processor.

12. The processing system, as recited in claim 10, wherein the execution unit is configured to generate an atomic interrupt disable signal, the execution unit being configured to reset the atomic interrupt disable signal in response to successful execution of the second instruction.

13. The processing system, as recited in claim 12, further comprising:
an interrupt control register providing an interrupt enable signal; and
wherein the interrupt controller receives an enable signal based on a logical combination of the atomic interrupt disable signal and the interrupt enable signal.

14. The processing system, as recited in claim 10, wherein the execution unit is a load-store unit configured to generate an atomic interrupt disable signal that selectively disables interrupts in response to a successful conditional store instruction.

15. The processing system, as recited in claim 10, wherein the shared resource is a peripheral device.

16. A processing system comprising:
a plurality of processing cores; and
a shared memory coupled to each processing core of the plurality of processing cores,
wherein each processing core of the plurality of processing cores comprises an interrupt controller and a load-store unit configured to execute a spin lock at said processing core without first disabling interrupts of said processing core;
where the spin lock is executed by:
executing a first instruction to generate a reservation of the shared resource for said processing core, and
after generating the reservation of the shared resource for said processing core, executing a second instruction by said processing core to acquire a lock of the shared resource; and
where the load-store unit is configured to selectively disable interrupts of execution of said processing core in response to a signal indicating successful execution of a conditional store operation by the shared memory.

17. The processing system, as recited in claim 16, further comprising:
interconnect coupled between the shared memory and each of the plurality of processing cores,
wherein the shared memory comprises an exclusive monitor including an entry corresponding to a shared memory location, the entry including a master identifier and a reservation status, the master identifier indicating a core of the plurality of processing cores that has reserved the shared memory location.

18. The processing system, as recited in claim 16, wherein the load-store unit generates an atomic interrupt disable signal that selectively disables interrupts in response to a successful conditional store instruction.

19. The processing system, as recited in claim 18, wherein each processing core of the plurality of processing cores further comprises:
an interrupt control register providing an interrupt enable signal; and
wherein the interrupt controller receives an enable signal based on a logical combination of the atomic interrupt disable enable signal and the interrupt enable signal.

20. The processing system, as recited in claim 19, wherein the load-store unit is configured to reset the atomic interrupt disable signal in response to a successful conditional store instruction.

\* \* \* \* \*